Patented July 29, 1947

2,424,778

UNITED STATES PATENT OFFICE 2,424,778

COMPOSITION FOR AND METHOD OF WHITENING TEXTILES WITH A BLUE FLUORESCENT MATERIAL AND ULTRAMARINE

Peter Wright Tainsh, Spital, Bromborough, Wirral, England, assignor to Lever Brothers Company, Cambridge, Mass., a corporation of Maine No Drawing. Application May 2, 1944, Serial No. 533,799. In Great Britain May 20, 1943

2 Claims. (Cl. 8—77)

The invention relates to a method of improving the whiteness of articles, substances and materials, and to preparations for effecting such improvement.

It is well known that many materials which in everyday life are called "white" possess a slightly yellowish or similar off-white tint. Since the degree of whiteness is frequently one of the main criteria by which materials are judged by the public, it is a common practice in many arts and industries to counteract as far as possible the yellowish or off-white tint, and thus enhance the apparent whiteness, by a treatment with "blueing agents." These consist of certain blue colors, pigments or dyes having generally a slight reddish tint and the desired whitening effect is produced as a result of the blue and red combining with the yellowish tint of the material to give a light grey or bluish grey which looks whiter and is more pleasing to the eye than the faint yellow coloration of the untreated material.

The most widely used blueing agent is ultramarine, a pigment customarily employed for improving the whiteness of many industrial products, such as paper, textiles, starch and sugar. Ultramarine also forms the active component of most commercial washing blues used in domestic and commercial laundering operations, where it is added to the last rinse to correct the faint yellow cast which white fabrics tend to acquire after repeated washings. Other commercially used blueing agents are organic dyes, such as indigo and alizarin dyestuffs.

It has also been proposed to eliminate the yellowish or off-white tint of materials, such as textile fabrics, paper and the like, by treating the materials during manufacture or subsequently with a solution of a compound which when dissolved produces a blue fluorescence, such as a compound of the coumarin group, preferably methyl umbelliferone.

I have now found that while both the customary blueing agent and methyl umbelliferone are effective in counteracting the yellow or similar off-white tint of materials, a further substantial improvement can be obtained by applying the said two substances in combination, such combination imparting to the treated materials a higher degree of whiteness and a more pleasing appearance than can be achieved by either substance alone.

The invention is based on this discovery and provides a novel method of improving the whiteness of materials which comprises impregnating the material with small proportions of a blueing agent and a substance which in solution or at high dispersion shows a blue fluorescence.

Substances which in solution or at high dispersion show a blue fluorescence will for convenience hereinafter be briefly referred to as "blue-fluorescent substances." It will be understood that for the purpose of the invention the blue-fluorescent substances must be substantially colorless or at least must not impart to the treated material any noticeable color.

The term "blue fluorescence" is used herein to include all shades of blue and violet, and the term "blue-fluorescent substance" is intended to include a mixture of substances which in solution or at high dispersion produces a blue fluorescence.

The invention further consists in novel preparations comprising mixtures of a blueing agent and a blue-fluorescent substance for the purpose of improving the white appearance of materials.

Blue-fluorescent substances are well known and comprise a large number of different chemical compounds. Very satisfactory results have, for example, been obtained with the above mentioned compounds of the coumarin group, particularly hydroxy coumarins such as umbelliferone and hydroxy substituted coumarins such as beta-methyl umbelliferone. Other useful blue-fluorescent compounds are, for example, 1-naphthyl-amine-4-sulfonic acid and sodium 2-naphthyl-amine-6:8-disulfonate. The blueing agents are those commonly employed in the above mentioned arts.

The proportion in which the blueing agents and the blue-fluorescent substances are to be used and the ratio between blueing agent and blue-fluorescent substance may vary considerably and are determined by various factors such as the particular blueing agent and blue-fluorescent substance employed, the shade and depth of the off-white tint of the material to be treated and the degree of whiteness which it is desired to achieve. The blue-fluorescent substances may as a general rule be used in proportions varying from about 0.1% to as little as 0.001% of the weight of the material to be treated. The requisite proportions of blueing agents vary likewise within wide limits. Of organic dyestuffs which have a very intense coloring power, such as indigo, only minute proportions are required, the amount to be employed being as a general rule very much smaller than the amount of the blue-fluorescent substance used in conjunction with it, and an improved whitening effect has, for example, been obtained with a combination containing as little as one part of indigo to one thousand parts of beta-methyl umbelliferone. With ultramarine, which has considerably less coloring power than indigo, the useful proportions lie within narrower but still relatively wide limits. Thus, when using mixtures of ultramarine and beta-methyl umbelliferone for the treatment of textiles and paper, I have found that satisfactory results are obtained when for one part of ultramarine there is used from about one half to about ten parts of beta-methyl umbelliferone. In any particular case a few comparative tests will readily show which combinations give the best results.

In carrying the invention into effect the blueing agent and the blue-fluorescent substance are preferably employed in the form of a suspension or solution in a suitable medium, preferably water, and it may be an advantage to add to the water an alkaline compound, for example, borax or sodium carbonate, as alkaline conditions may enhance the whitening effect.

The treatment according to the invention is applicable to a great variety of materials, in particular textile fabrics, yarns and paper. It can be used with great advantage in the laundering of white articles in place of the conventional blueing operation. This particular application of the invention and the substantial improvement over the prior art will be illustrated by the following test.

New white cotton fabrics were washed with soap ten times, and after each wash rinsed three times in clean water, dried and ironed. The fabrics which had acquired a distinct yellow cast were then rinsed each in a different slightly alkaline blueing solution, one solution containing 0.01% of beta-methyl umbelliferone and 0.004% of ultramarine, the others containing different quantities of either beta-methyl umbelliferone or ultramarine only. The fabrics were then dried and ironed and it was found that the fabric which had been rinsed in the blueing solution containing both beta-methyl umbelliferone and ultramarine was much superior in whiteness to the fabrics rinsed in any of the other blueing solutions.

It will be apparent that my invention will be subject to many modifications without departing from the essence of the invention, and all such modifications are intended to be included within the scope of the following claims.

I claim:

1. A process of improving the whiteness of normally white textile materials that are adapted for repeated laundering and which have acquired a yellowish or off-white tint, which comprises treating said materials following the laundering thereof by rinsing them in a solution of a blue fluorescent substance and ultramarine, the amounts of said blue fluorescent substance and ultramarine in the rinsing solution being sufficient to impart an apparent whiteness to the materials so treated that is superior to that obtainable when either the blue fluorescent substance or the ultramarine is used alone.

2. A new composition of matter for treating normally white textile materials that possess a yellowish or off-white tint after a laundering operation, so as to improve their whiteness, comprising a blue fluorescent substance and ultramarine in proportions such that said materials treated with the composition are superior in apparent whiteness to that obtainable when either the blue fluorescent substance or the ultramarine is used alone.

PETER WRIGHT TAINSH.

REFERENCES CITED

The following references are of record in the file of this patent:

UNITED STATES PATENTS

| Number | Name | Date |
| --- | --- | --- |
| 2,020,539 | Dourif | Nov. 12, 1935 |
| 2,341,009 | Axelrad | Feb. 8, 1944 |
| 2,089,413 | Paine | Aug. 10, 1937 |

FOREIGN PATENTS

| Number | Country | Date |
| --- | --- | --- |
| 193,289 | Germany | Jan. 11, 1908 |
| 522,672 | Great Britain | June 24, 1940 |
| 9,442 | Great Britain | 1889 |